July 17, 1923.

E. A. LAUGHLIN

ROUTING MECHANISM

Filed Nov. 17, 1922

1,462,234

2 Sheets-Sheet 1

Inventor.
Edward A. Laughlin

July 17, 1923.

E. A. LAUGHLIN

ROUTING MECHANISM

Filed Nov. 17, 1922

1,462,234

2 Sheets-Sheet 2

Inventor:
Edward A. Laughlin,
By Dyrenforth, Lee, Chritton & Wiles
Attys.

Patented July 17, 1923.

1,462,234

UNITED STATES PATENT OFFICE.

EDWARD A. LAUGHLIN, OF PORT ARTHUR, TEXAS.

ROUTING MECHANISM.

Application filed November 17, 1922. Serial No. 601,577.

*To all whom it may concern:*

Be it known that I, EDWARD A. LAUGHLIN, a citizen of the United States, residing at Port Arthur, in the county of Jefferson and State of Texas, have invented a new and useful Improvement in Routing Mechanism, of which the following is a specification.

This invention relates to improvements in routing mechanism, and more especially to a routing mechanism adapted for cutting grooves or depressions in the surface of material, such as dadoes, mortises, and the like. My mechanism is so constructed that such grooves or depressions may be cut in a great variety of different shapes. Also, they may be undercut or tapered, as desired, or may be made slanting or straight. A great variety of grooves or depressions may be made by adjusting the mechanism as desired. My mechanism is also so constructed that it may be readily and quickly attached to a saw machine of any ordinary construction, thus transforming said sawing machine into a routing machine adapted to cut grooves or depressions in the surface of material in a great variety of forms. Other features and advantages of my invention will appear more fully as I proceed with my specification.

Figure 1:
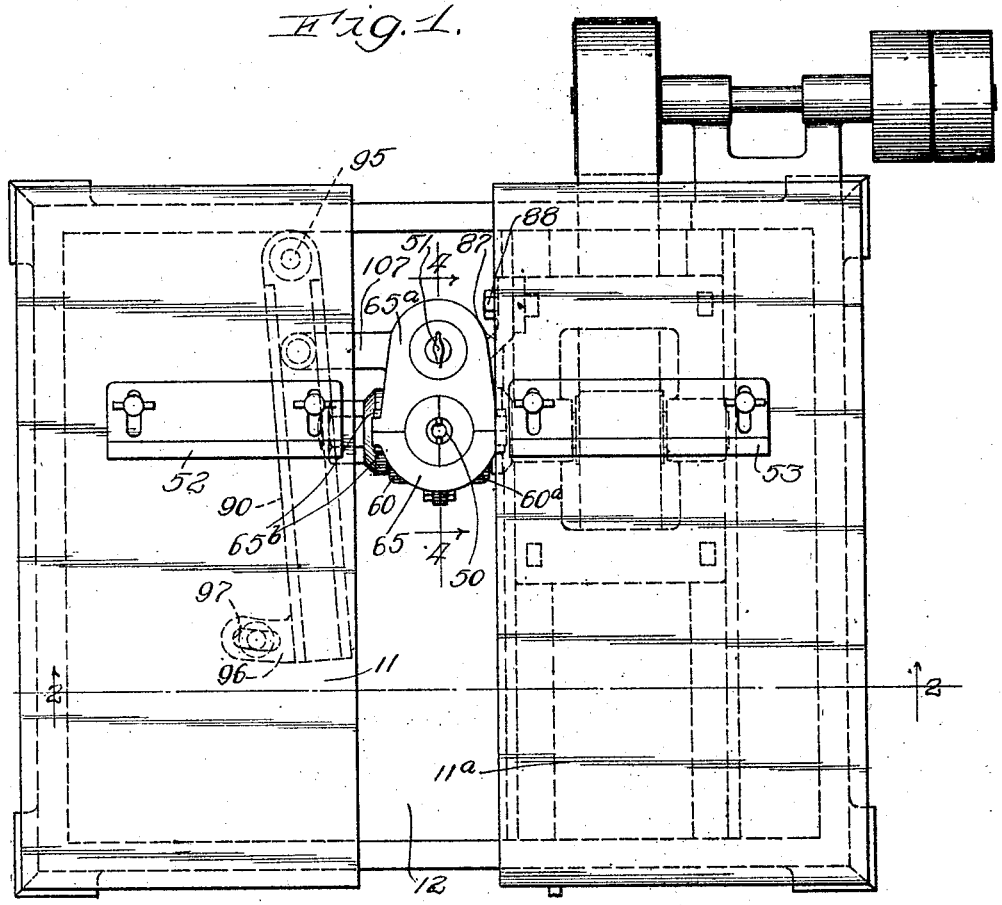
Figure 2:
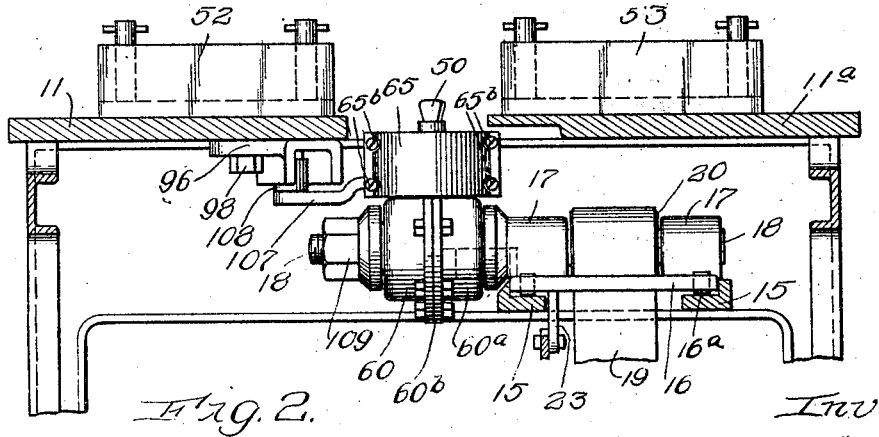
Figure 3:
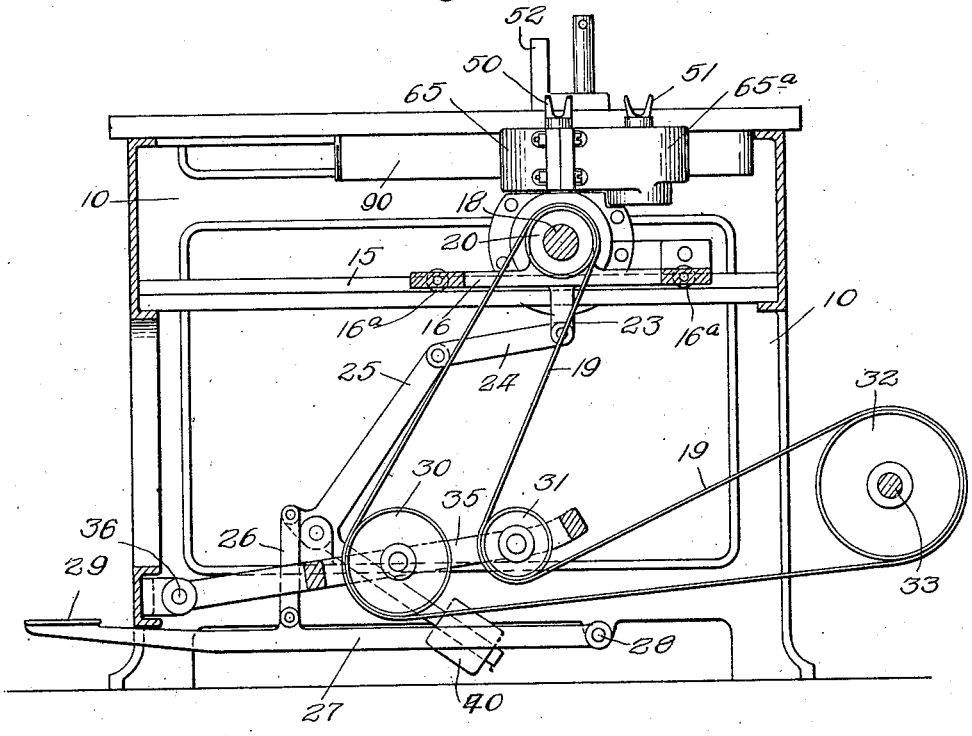
Figure 4:
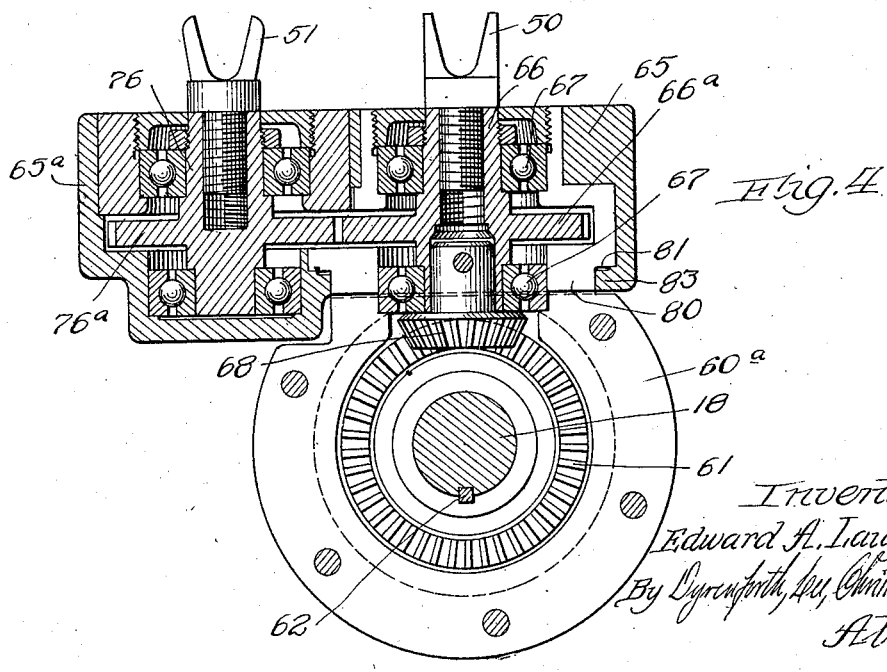

A device embodying the features of my invention is shown in the accompanying drawings, in which Figure 1 is a top plan view of one end of a saw machine, showing my routing mechanism attached thereto, Fig. 2 is a view taken as indicated by the line 2 of Fig. 1, Fig. 3 is a view in end elevation, and Fig. 4 is a view taken as indicated by the line 4 of Fig. 1 on an enlarged scale.

As shown in the drawings, 10 indicates, in general, the frame of a saw machine of common construction, provided with a table 11, 11$^a$. It will be noted that the table is made in two sections, 11, 11$^a$, leaving a longitudinal slot or opening 12 therebetween. The table sections 11, 11$^a$ are ordinarily, one or both, made adjustable in order to vary the width of the slot 12, as desired. Beneath the table section 11$^a$ are provided two tracks or guides 15, on which is mounted a carriage 16 provided with rollers 16$^a$, thus adapting it for reciprocating longitudinal sliding movement on said tracks. The carriage 16 is provided with two bearings 17 carrying rotatably mounted therein a shaft, arbor or mandrel 18. The shaft 18 is adapted to be driven by a belt 19 operating on the pulley 20. The carriage 16 is provided with a downwardly projecting arm 23, attached by means of the link 24 to the long arm of a bell crank lever 25. The short arm of this bell crank lever is attached by means of a link 26 to a long horizontal lever 27 pivoted at 28 and provided at its free end with a pedal 29. The belt 19, below the pulley 20, is passed over the two idler pulleys 30 and 31 (see Fig. 3) and thence passed over the pulley 32, which is mounted on the power shaft 33 suitably driven. The idler wheels 30 and 31 are carried by an arm 35, which is pivoted at 36 and suitably weighted in order to keep a sufficient tension on the belt 19. It will be seen that, by this construction, downward pressure on the pedal 29 will serve to advance the carriage 16. A suitable weight 40 is provided for the purpose of withdrawing the carriage. The parts heretofore described serve to illustrate the substantial construction of an ordinary saw machine. In such saw machines, the shaft 18 carries a circular saw, having its cutting edge projecting upwardly through the slot 12 between the table sections, so that it will operate on work laid on the table. By means of the pedal 29, the carriage 16 may be given reciprocating motion, thus moving the saw backward and forward in the slot 12.

In the drawings, I have not shown the circular saw on the arbor 18, as this is removed before my routing mechanism is attached. My routing mechanism is mounted on the shaft 18, as shown in the drawings, and is provided with two routing tools or cutters 50 and 51, which project upwardly through the slot 12 above the top of the table, so that they will engage work laid on the top of the table sections. Suitable adjustable guides of any ordinary form, such as indicated by 52 and 53, are provided on the top of the table for the purpose of holding work in place or alinement.

I will now describe more in detail the construction of the routing mechanism. This routing mechanism comprises a substantially cylindrical casing formed of two sections 60 and 60$^a$, suitably bolted together as indicated at 60$^b$. This cylindrical casing has housed within it a bevel gear 61 which is attached to the arbor 18 in any suitable manner, such as by means of a key 62. The upper part of the casing 60 has rotatably mounted thereon an elongated casing 65, 65ª. This casing is formed of two sections 65 and 65ª, suitably bolted together as indicated at 65ᵇ. Mounted within the casing 65, 65ª is a vertically arranged rotatably supported tubular member 66. This member is rotatably supported in any suitable manner, such as by means of the bearings 67. The lower end of the tubular member 66 carries a bevel pinion 68 meshing with the bevel gear 61; and its upper end is adapted to support the tool or cutter 50. The casing 65, 65ª carries at its other end a similar rotatable member 76 adapted to hold at its upper end, as shown, the tool or cutter 51. The members 66 and 76 are provided with meshing pinions 66ª and 76ª, respectively, whereby rotation of the member 66 will rotate the member 76.

As has been stated, the casing 65, 65ª is rotatably mounted on the casing 60. This rotation is provided for in the following manner. The casing 60 has an upwardly projecting cylindrical part 80 concentrically arranged with respect to the member 66. The part 80 is provided with a circular flange or shoulder 81. The casing 65, 65ª fits over the part 80 and has an inwardly turned edge 83 projecting under the shoulder 81. Rotation of the casing 65, 65ª is therefore permitted about the axis of the member 66 as a center. Rotation of the casing in this way causes revolution of the cutter 51 about the cutter 50 as a center.

In order to prevent the entire routing mechanism from turning around with the shaft 18, the casing 60ª is provided with a short offset arm 87, which is attached to the carriage 16 by means of the machine screw 88. By means of this construction, it will be noted that rotation of the shaft 18, operating through the bevel gears 61 and 68, will rotate the cutting tool 50. Rotation of the part 66, operating through the pinions 66ª and 76ª, will serve to rotate the cutting tool 51.

It will be seen that if a board or other work is placed on top of the table lying across the slot 12 and the tools 50 and 51 rotated and the carriage 16 moved on its tracks, the cutting tools will engage the work and make a groove across it. If the two tools 50 and 51 move in coincident paths, it is obvious that the groove would have parallel sides. If, however, the tool 51 is revolved around the tool 50 as the carriage is moved, the groove will be tapered depending upon the rate of revolution of the tool 51. I have stated that the groove would be tapered, although more accurately it should be noted that with the device made exactly as shown in the drawings, one side of the groove would be straight and the other side would be slightly curved; the chord of such curve, however, not being parallel with the straight side of the groove. Since the arc thus described will be almost straight, the groove would be substantially a tapered groove. If desired, the speed of revolution of the tool 51 could be calculated so that a groove with perfectly straight tapered sides would be formed. This could be done by making the guide 90 (to be hereinafter described more in detail) of the proper curvature.

I will now describe in detail the means by which the desired revolution of the cutting tool 51 is accomplished during the reciprocation of the carriage 16 in order to make a tapered groove. On the underside of the table section 11 is fastened a guide or track 90. This track or guide 90 is pivotally attached at 95. The swinging end is provided with an arm 96 having an arcuate slot 97. A machine screw 98 extends through the slot 97 into the bottom of the table top. By this construction, the guide 90 may be adjusted as desired in order to adjust the amount of revolutiton given to the cutter 51 during the travel of the carriage. It is obvious also that if desired the raceway 90 could be made with the curvature desired in order to give any desired formation to the groove cut in the work. For example, the guide 90 could be curved so that the cutters 51 and 50 will make a tapered groove with straight sides. The casing 65ª is provided with an arm 107, having on one end a friction roller 108 which moves within the guide 90 to cause rotation of the tool 51 about the tool 50, in accordance with the setting or adjustment of the guide 90.

For the purpose of illustration, merely, I have shown here the tool 51 (see Fig. 3) as enlarged at the end in order to form an undercut and have shown the tool 50 as having straight sides. It is perfectly obvious that, without detracting from the spirit of this invention, one or both tools may be straight or undercut, or they may be varied as desired in order to give any desired kind and depth of cut.

It is to be noted that the entire routing mechanism can be easily and quickly detached from the mandrel 18 by removing the nut 109 and the machine screw 88. The routing mechanism may then be lifted off and the regular saw placed on the mandrel.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new and desire to secure by Letters Patent, is:

1. A routing mechanism comprising two cutting tools, means for rotating the cutting tools, means for reciprocating said cutting tools while rotating, and means for revolving one of said cutting tools about the other as a center while reciprocating the same.

2. A routing mechanism comprising two cutting tools rotatably supported on a carriage, means for rotating the cutting tools, means for reciprocating the carriage, and means for revolving one of said cutting tools about the other as a center while reciprocating the carriage.

3. A device of the character described comprising a sliding carriage, means for reciprocating said carriage, a routing mechanism detachably secured to said carriage, said routing mechanism comprising two rotatably supported cutting tools so mounted as to permit one of said cutting tools to be revolved about the other as an axis.

4. A routing mechanism adapted for attachment to the sliding carriage of a saw machine, said sliding mechanism comprising two cutting tools rotatably supported so as to permit one of said cutting tools to be revolved about the other as an axis during rotation of the same.

5. A routing mechanism comprising a casing having rotatably supported therein two cutting tools, one of said cutting tools adapted to be revolved about the other as a center during rotation of the same.

6. A routing mechanism comprising a casing having rotatably supported therein two cutting tools, one of said cutting tools adapted to be revolved about the other as a center during rotation of the same, and means for so revolving said cutting tools.

7. A routing mechanism comprising a casing having rotatably supported therein two cutting tools, one of said cutting tools adapted to be revolved about the other as a center, means for rotating the cutting tools, means for reciprocating the routing mechanism, and means for revolving one of the cutting tools about the other as a center during reciprocation.

8. A routing mechanism comprising a casing having rotatably supported therein two cutting tools, one of said cutting tools adapted to be revolved about the other as a center, means for rotating the cutting tools, means for reciprocating the routing mechanism, and means for revolving one of the cutting tools about the other as a center during reciprocation, said means comprising an adjustable guide and an arm on the routing mechanism having one end operating in said guide.

9. A routing mechanism comprising a casing having rotatably supported therein two cutting tools, one adapted to be revolved about the other as a center, and means for controlling said revolution.

10. A routing mechanism comprising a casing having rotatably supported therein two cutting tools, one adapted to be revolved about the other while both are being rotated, and means for controlling said revolution.

EDWARD A. LAUGHLIN.